Aug. 30, 1966  M. H. GROVE  3,269,695
VALVE CONSTRUCTION
Filed May 5, 1965  4 Sheets-Sheet 1
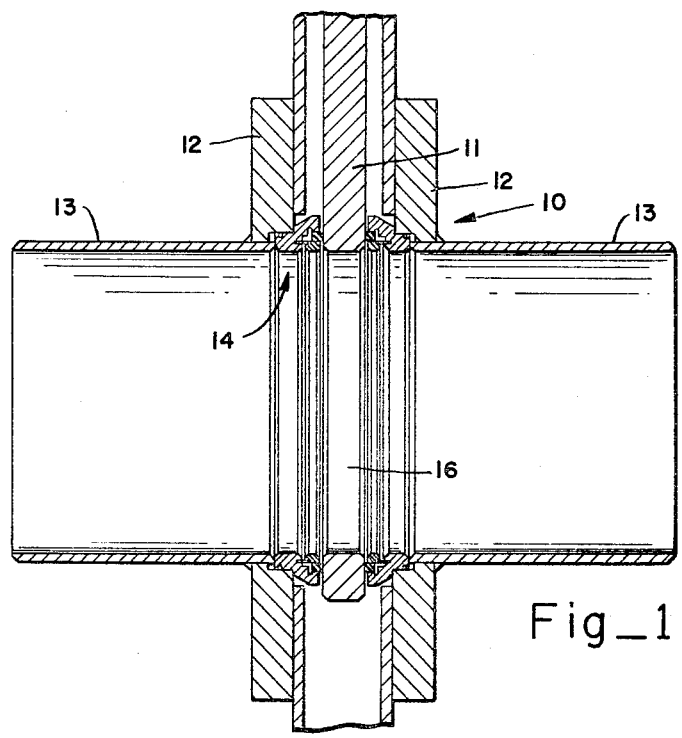
Fig_1
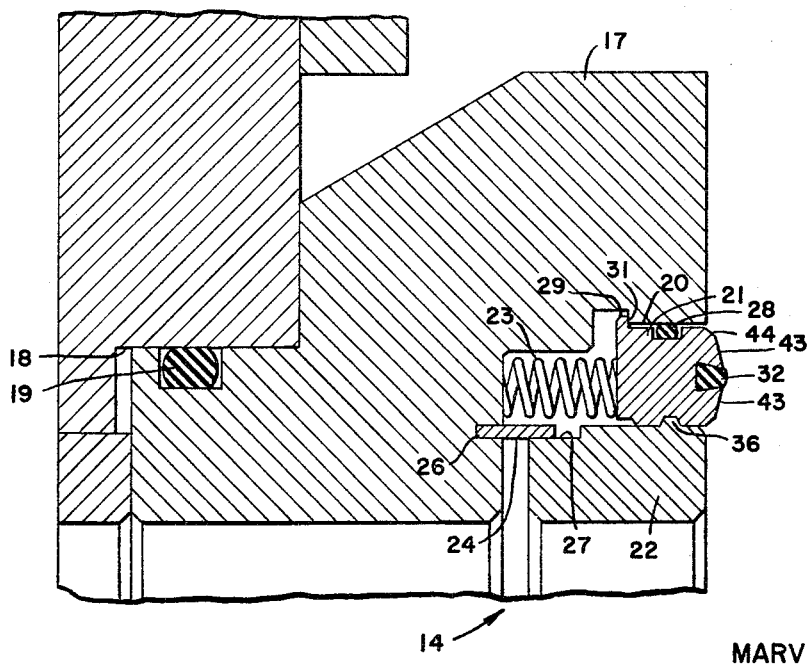
Fig_2
INVENTOR.
MARVIN H. GROVE
BY
*Flehr and Swain*
ATTORNEYS

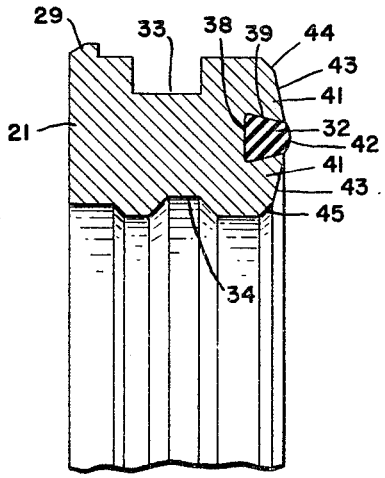
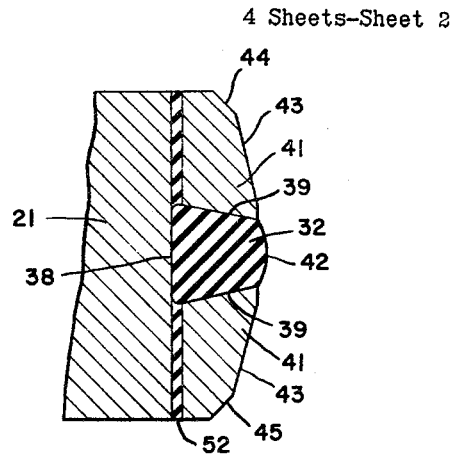
Fig_3
Fig_4
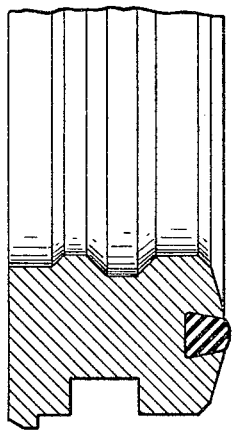
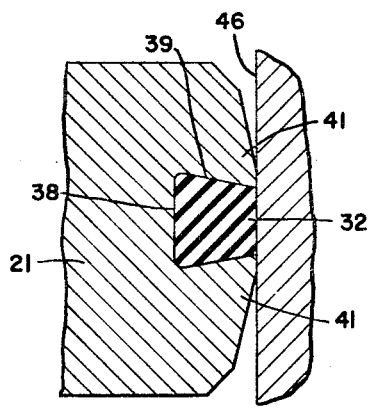
Fig_5
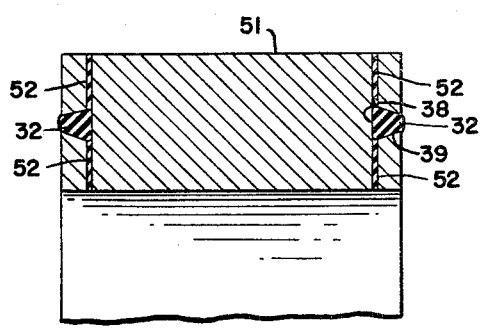
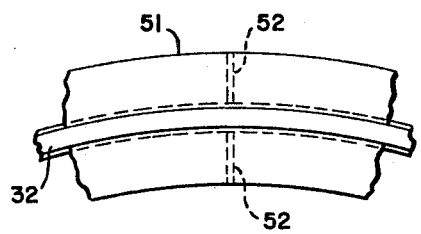
Fig_6
Fig_7
INVENTOR.
MARVIN H. GROVE
BY
ATTORNEYS

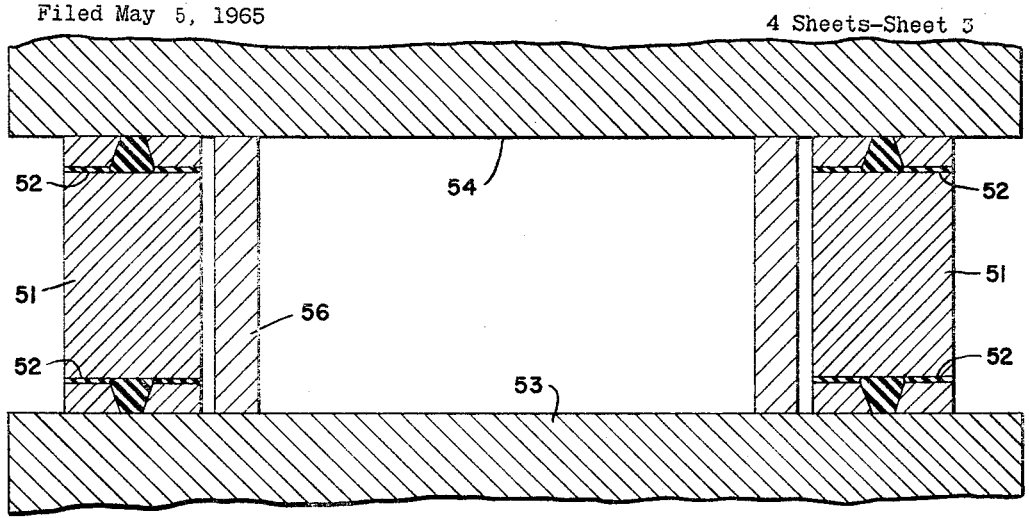
Fig_8
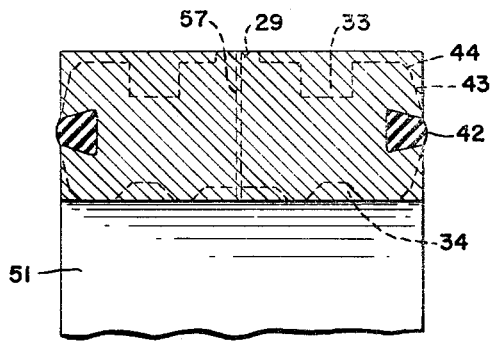
Fig_9
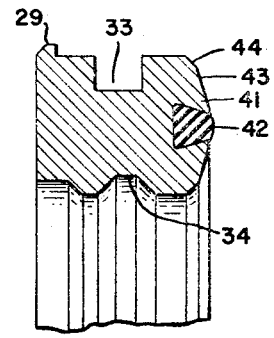
Fig_10
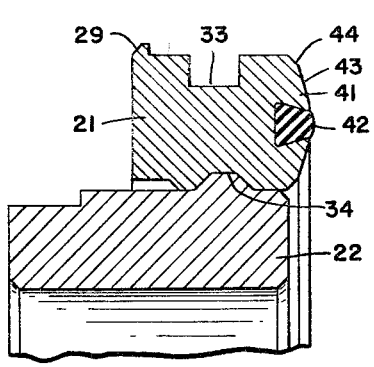
Fig_11
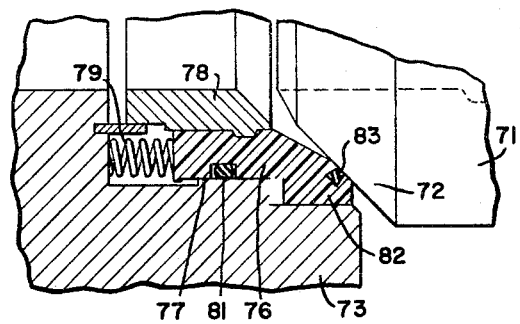
Fig_13

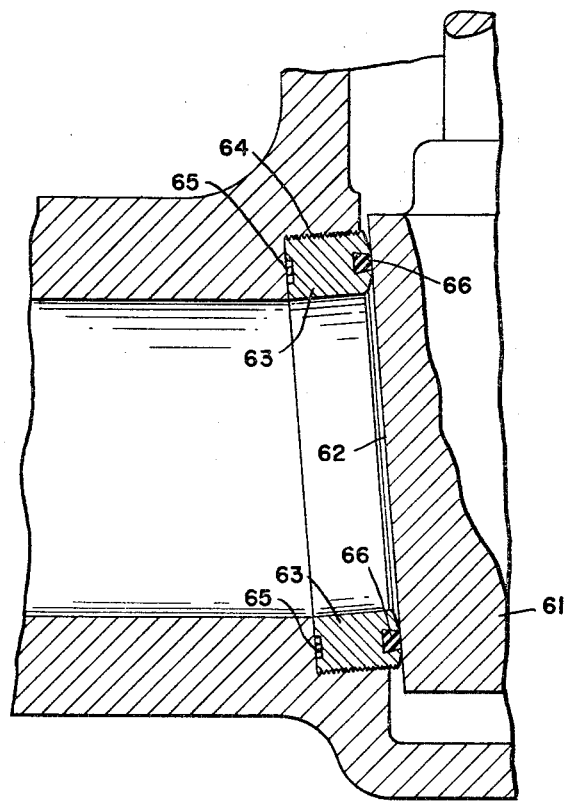
Fig_12
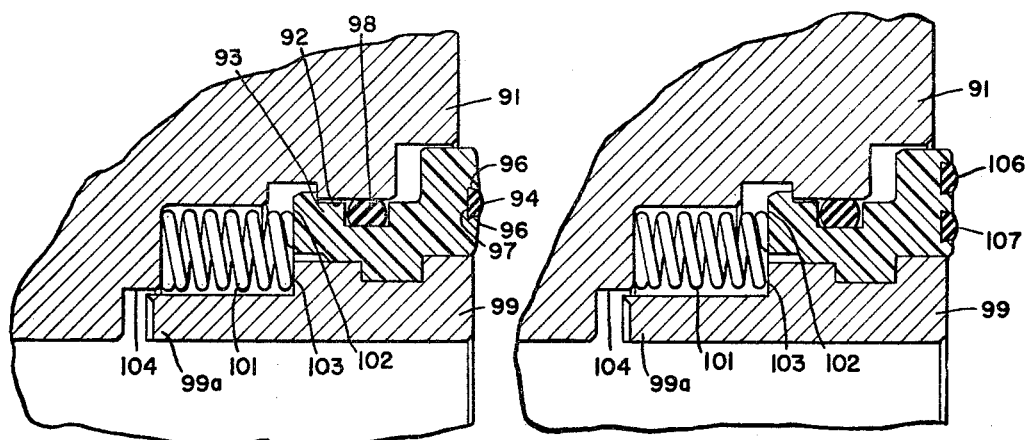
Fig_14
Fig_15
INVENTOR.
MARVIN H. GROVE
BY
*Fleke & Swain*
ATTORNEYS

United States Patent Office 3,269,695
Patented August 30, 1966

3,269,695
VALVE CONSTRUCTION
Marvin H. Grove, 340 Hillside Ave., Piedmont, Calif.
Filed May 5, 1965, Ser. No. 453,403
6 Claims. (Cl. 251—174)

This invention relates generally to the construction of valves such as are used for controlling flow of various fluids, including liquids and gases. The present application is a continuation-in-part of my copending applications Serial No. 237,056, filed November 13, 1962, now abandoned, Serial No. 253,416, filed January 23, 1963, now abandoned, Serial No. 310,640, filed September 23, 1963, and Serial No. 370,418, filed May 27, 1964.

It has been common to construct valves with sealing means formed of resilient materials, such as natural and synthetic rubber, neoprene, Teflon, Viton, nylon, elastomers of the polyurethane type, and the like. Where the resilient material is relatively soft, such as a synthetic rubber or an elastomer of 60–80 durometer hardness, it is difficult to provide a simple construction which will function properly for the higher pressures, as for example pressures of the order of 200 p.s.i. or higher. However, such soft materials are desirable in that they can provide an effective seal on a valve working surface which is not as smooth as is required for the harder materials. Also the softer materials can seal irrespective of the presence of foreign solids, and they have a desirable wiping action when the valve member is moved between open and closed positions. The harder materials like nylon are desirable for high operating pressures, but they tend to require smoother valve working surfaces to form a tight seal. Also in general they tend to be detrimentally affected by the presence of foreign solids, and they do not have the desired wiping action to the same degree as the softer materials.

One common expedient for the mounting of a resilient non-metallic seal member is to have it retained within a recess which surrounds one of the flow passages, and which may for example be formed in an annular metal portion of the body, or in an annular metal mounting ring which in turn is carried by the body. The resilient material may be bonded or force fitted within its accommodating recess, or may be loosely retained. It is difficult to form an effective bond or force fit between the resilient material and the metal walls of the recess, such as will prevent dislodgment or mutilation of the insert under certain operating conditions. This is due to various reasons, including the fact that most synthetic rubbers and resilient elastomers are subject to swelling when contacted with liquids like water or liquid hydrocarbons, and such swelling in a recess of fixed dimensions results in virtual extrusion in a direction from the open side of the recess, with the result that an increased amount of the insert is exposed and is subject to mutilation when the associated valve member is moved between full open and closed positions. In the event it is attempted to maintain spaces within the recess within which the insert may expand, then fluid pressure may find its way into such spaces, and cause dislodgment of the insert under certain operating conditions.

In instances where it is attempted to have the resilient insert loosely accommodated within a recess, the sealing member is again subject to dislodgment, which in some instances may be prevented by venting the bottom of the recess to the downstream side. However, such an assembly has certain disadvantages, including particularly the fact that the parts forming the accommodating recess must be carefully machined and for the higher operating pressures the resilient seal member must be made of relatively hard material, as for example materials having a durometer hardness of the order of 90.

A further disadvantage of sealing arrangements which utilize an insert of non-metallic resilient material in a recess formed in a metal member, is that the valve member under normal operating conditions has its valve working surfaces brought into direct metal-to-metal contact with metal surfaces particularly adjacent the resilient material. Thus movement of the valve member involves sliding the metal valve working surface over metal surfaces that are adjacent the resilient sealing material. Such metal-to-metal contact complicates the design of a valve, particularly since metal must be selected which will not be subject to excessive wear or scoring.

In addition to the above, in the construction of certain types of valves (e.g. gate valves) in the larger sizes it is desirable to provide sealing assemblies having a substantial range of accommodation. Prior assemblies of this kind have been relatively complicated and expensive due to the number of parts employed, and the design limitations that they impose upon the body and other parts of the valve.

In general, it is an object of the present invention to provide a valve construction having sealing means incorporating the desirable properties of relatively soft resilient materials, but without the disadvantages referred to above.

Another object of the invention is to provide sealing means which utilizes relatively soft resilient material together with a carrying means therefor which is of such character that the resilient material may swell under certain operating conditions without causing injury when the valve is operated.

Another object of the invention is to provide sealing means including both relatively hard and relatively soft nonmetallic resilient materials, and which forms effective sealing contact with the adjacent valve working surface, without causing the valve working surfaces to have metallic contact with parts adjacent the resilient material.

Another object of the invention is to provide a valve construction characterized by relatively a simple but effective sealing assembly which provides a substantial range of accommodation and which is well adapted for use with gate valves in the larger sizes.

Another object of the invention is to provide a sealing means including relatively soft and relatively hard non-metallic resilient materials, and which is pressure responsive to promote good sealing contact with the adjacent valve working surface.

Additional objects and features of the invention will appear from the following description in which the preferred embodiments have been set forth in detail in conjunction with the accompanying drawing.

Referring to the drawing:

FIGURE 1 is a side elevational view in section illustrating a valve made in accordance with my invention;

FIGURE 2 is a detail in section, on an enlarged scale, illustrating one of the sealing assemblies incorporated in FIGURE 1;

FIGURE 3 is a side elevational view in section illustrating the composite seal member incorporated in the assembly of FIGURE 2;

FIGURE 4 is an enlarged detail in section showing one end of the seal member shown in FIGURE 3;

FIGURE 5 is a view like FIGURE 4, but showing the seal member in contact with the valve working surface of a valve part, such as a valve gate;

FIGURE 6 is a side elevational view in section illustrating an annulus made of material like nylon, being prepared for manufacturing two seal members of the type shown in FIGURE 3;

FIGURE 7 is an end view of the member shown in FIGURE 6;

FIGURE 8 is a side elevational view in section illustrating the procedure for molding and curing the softer resilient material;

FIGURE 9 is a view like FIGURE 6, but indicating machining operations after the molding operation;

FIGURE 10 is a detail in section showing one of the seal members after machining operations thereon indicated by dotted lines in FIGURE 9;

FIGURE 11 is a detail in section illustrating the seal member of FIGURE 10, applied upon a metal carrier ring;

FIGURE 12 is a half section illustrating a gate valve of the wedge type using my invention;

FIGURE 13 is a detail in section illustrating another embodiment of the invention intended for use with valves of the ball type;

FIGURE 14 is a detail in section on an enlarged scale showing another embodiment of the invention intended particularly for use with the higher operating pressures; and FIGURE 15 is a detail like FIGURE 14 but showing another embodiment in which a plurality of inserts are provided.

The valve illustrated in FIGURE 1 is of the gate type and consists of the body 10 together with the movable gate 11. While the body may be made in various ways, in this particular instance it is shown as being fabricated from metal plates. The side walls 12 of the body are machined to receive the welded-in hubs 13. The gate 11 normally is connected to an operating rod (not shown) which extends to the exterior through a suitable bonnet (not shown).

The operating means (not shown) which is connected to the operating rod may be any one of several types, such as handwheel means, gear means, or remote controlled operators of the pneumatic, hydraulic or electrical type.

Interposed between the inner end portions of the hubs and the gate 11 are the annular sealing assemblies 14. As will be presently explained these assemblies are sealed with respect to the body, and they have sealing contact with the side valve working surfaces of the gate 11.

While the gate 11 may vary in different instances, in the example illustrated it is a flat plate provided with a port 16 which registers with the flow passages through the hubs 13, for open position of the valve.

The construction of each of the assemblies 14 is shown in FIGURE 2. It consists of a mounting ring 17 which has one end portion machined to interfit a machined bore 18 in the valve body. Leakage between these interfitting portions is prevented by the seal ring 19 of the resilient O-ring type. The other end portion of the mounting ring 17 is provided with a bore 20 that slidably accommodates the non-metallic seal member 21. In this embodiment member 21 is mounted upon the carrier ring 22. It is made of a relatively hard wear resisting resilient material, such as nylon. A plurality of circumferentially spaced coiled compression springs 23 engage the inner end of the seal member 21, thus urging it toward the right as viewed in FIGURE 2. A sediment guard 24 is shown extending between the mounting ring and the carrier ring 22. This guard can be in the form of a split ring which is inserted in an annular recess 26 of the mounting ring, and which slidably overlaps a cylindrical surface 27 on the adjacent portion of the carrier ring.

The annular seal member 21 is sealed with respect to the mounting ring by suitable means such as the sealing member 28 of the O-ring type. The seal member 21 is retained in the position illustrated in FIGURE 2 by a projecting flange or lip 29, which engages the shoulder 31 on the mounting ring.

That end of the seal member which contacts the adjacent gate is provided with an annular insert 32 which, as will be presently explained, is made of a resilient non-metallic material relatively softer than the material used for making the seal member 21. Preferably the insert completely fills the recess and it is bonded to the surfaces 38 and 39.

The seal member 21 is shown by itself in FIGURE 3. Note that its outer periphery is provided with a groove or recess 33 for accommodating the resilient O-ring 28. Its inner periphery is provided with a groove 34 adapted to interfit a rib 36 on the outer periphery of the carrier ring 22.

One configuration of the end portion of the seal ring which contacts the adjacent gate is as follows. The resilient insert 32 is disposed within a recess defined by the bottom surface 38 and the outer and inner side surface 39. Note that as viewed in section the surfaces 39 are inclined with respect to each other, whereby they are convergent toward the end of the seal member. This serves to provide integral portions 41, adjacent both the outer and inner peripheries of the insert 32. The exposed exterior surface 42 of the insert 32 may normally be slightly bulged as indicated in FIGURE 3, but normally is flat when pressed in contact with a cooperating valve working surface. The exterior faces 43 of the portions 41 are cut away substantially as illustrated in FIGURE 3, whereby in section the angle made by these surfaces with respect to the plane of an adjacent valve working surface may, for example, be of the order of 15 degrees. The outer and inner corners are shown beveled as indicated at 44 and 45. It will also be noted that the surfaces 43 in the finished seal member are such that when this end of the seal member is contacted with a valve working surface which conforms to a plane, the initial contact is with the surface 42 of the resilient insert, and thereafter as this surface is slightly compressed, contact is established with the portions 41. In other words, the surfaces 43 adjacent the insert 32 are somewhat relieved with respect to the uncompressed exterior surface 42 of the insert.

The construction described above is illustrated in enlarged detail in FIGURE 4. Note the slight extension of surface 42 with respect to the adjacent faces of the portions 41. FIGURE 5 illustrates what happens when the seal member is applied to the valve working surface 46 of a gate. As pointed out above, the initial force with which the seal member is urged against the gate, which is by virtue of the compression springs 23, serves to compress the insert 32 sufficiently to directly contact the portions 41 with the gate. As the force with which the seal member is urged against the gate increases, such force serves to bend or deflect the portions 41 against the insert 32, thus increasing the pressure upon this insert, and thereby increasing the bearing pressure between the insert surface 42 and the valve working surface. This squeezing or compressing action is conducive to maintaining a good fluid tight seal between the resilient rubber insert and the valve working surface. At the same time the soft resilient insert is capable of withstanding relatively high fluid pressures because it is carried within the harder resilient material.

In general the seal described above possesses some of the attributes of both hard and relatively soft resilient materials. In normal operations, with the soft resilient insert squeezed and pressed into contact with the valve working surface, a good fluid type seal is established, even though the valve working surface may be finished with a surface which normally might not give a fluid tight seal with material like nylon. In addition, the soft resilient material establishes a seal irrespective of the presence of foreign material, and it has a desirable wiping action upon the valve working surface when the gate is moved. As the gate is being moved between open and closed positions, a portion of the length of the seal member is out of contact with the valve working surface. For such portion of the seal member, the squeezing action upon the insert is relaxed. However, when the gate is returned to full open or closed positions, the squeezing action is re-established as described above.

There are additional reasons why the use of two different non-metallic resilient materials for seal member 21, is of special significance. Although the insert completely fills the recess, it is not subject to mutilation or dislodgement as in assemblies where the insert is in a recess formed in a metal member or members. Swelling of the insert, with or without intervening shrinkage is accommodated by flexing of the portions 43 with respect to each other and therefore does not tend to cause a break away of the bands between the insert and the side surfaces 39. Also since swelling is so accommodated, it does not tend to cause surface 42 to be bulged an excessive amount beyond the adjacent nylon surfaces, and thus the nylon properly protects the insert from mutilation or excessive wear when the valve is operated.

Under different operating conditions, fluid pressure differentials are applied to either the exterior or interior periphery of each seal member 21, thus applying force tending to cause radial contraction or expansion. Since nylon has some resiliency and does not have the rigidity of metal, the portion adjacent the gate is subject to some radial enlargement or contraction, with some distortion of the recess configuration. Such distortion is again accommodated without interfering with the desired sealing action and without tending to break the bond between the softer material of the insert and the harder nylon.

In the complete assembly 14 as shown in FIGURE 2 it will be evident that the insert 32 establishes a seal on a diameter which is somewhat smaller than the diameter of the bore 20, with which the O-ring 28 establishes sealing contact. Therefore, upon the upstream side of the valve, a fluid pressure area is presented to cause differential line pressure to urge the seal member 21 against the gate. Under such conditions the force with which the member 21 is urged against the gate is dependent upon both the thrust of the springs 23 and the differential line pressure.

When the valve is assembled each of the seal members 21 is forced inwardly a limited amount with respect to its mounting ring 17. The dimensions are such that some clearance exists between the sides of the gate and the end faces of the mounting ring 17. When the gate is closed it is urged by line pressure toward the downstream side, thus forcing the downstream seal member to substantially the limit of its movement. At such time the flange 29 upon the upstream side will be nearly in contact with the retaining shoulder 31. Assuming that it is desired to maintain a downstream seal, then the dimensions can be such that the thrust of the gate upon the downstream seal member provides sufficient force between the seal member and the gate to maintain the desired seal.

As pointed out above, the purpose of the flange or lip 29 is to retain the seal member within its mounting ring. At the time the seal member 21 is assembled within the mounting ring 17, it is forced into bore 20 and thereby deformed a sufficient amount to permit the flange 29 to pass through the bore 20. When the seal member has been forced sufficiently far into the bore 20, the flange 29 snaps into the position shown in FIGURE 2.

The carrier ring 22 strengthens and aids in maintaining the seal member 21 in its desired form. Preferably it has a relatively tight fit within the seal member. This can be obtained by immersing the seal member 21 in boiling water before it is forced over the carrier ring 22. Thereafter as the seal member cools, a tight shrunk fit is established.

A further purpose of the carrier ring 22 is to establish an approximate secondary seal or barrier in the event the seal member 21 is destroyed, as by fire.

FIGURES 6–11 illustrate a method for manufacturing the seal member 21. As shown in FIGURE 6 an annulus 51 is provided which is in the form of a section of a tube. It can be cut from tube stock or molded. Nylon is a suitable material because of its physical characteristics, which permit machining, and which make it suitable for use as a seal member. The member 51 is dimensioned whereby after certain operations, to be described, it forms two separate sealing members 21. The two recesses 38, in the same form as shown in FIGURE 3, are made in the ends of the member 51 by suitable machining. In addition, a plurality of small circumferentially spaced holes 52 are provided. These holes communicate between the inner corners of the recesses 38 and the outer and inner peripheries of the member 51.

After forming the member 51 as shown in FIGURES 6 and 7, a suitable resilient material, such as Viton or other suitable synthetic rubber or a suitable plastic elastomer like one of the polyurethane type, is molded into the recesses 38. Preferably, the molding operation is carried out as shown in FIGURE 8. In this instance I employ a pair of heated platens 53 and 54, which are carried by suitable means whereby they can be moved together or apart. After introducing suitable insert stock into the recesses 38, the member 51 is positioned between the platens, together with a concentric metal spacer ring 56 which has a length slightly less than that of the member 51. With application of clamping pressure the platens 53 and 54 are moved to a position where they engage the ends of the spacer 56, thus compressing the member 51 a predetermined amount. Assuming that the platens 53 and 54 are heated to a suitable curing temperature, the end portions of the members 51 are likewise heated together with the insert stock, thereby curing and bonding the insert stock to the adjacent surfaces defining the recesses. During this curing operation the insert stock is under some pressure and this is sufficient to cause discharge of trapped air and some extrusion through the small opening 52. The presence of such extruded material at the end of the curing operation is an indication of a proper molding operation, with elimination of air pockets or voids within the recesses. In addition, such extruded material serves as an added anchorage for the inserts within the recesses.

After completing the curing operation the member 51 can be subjected to a series of machining operations indicated by dotted lines in FIGURE 9. These machining operations serve to form the flange portions 29, the O-ring retaining recesses or grooves 33, the end surfaces 43, the beveled corners 44, and the groove or recess 34. Finally, a suitable tool is used to sever the member 51 into two identical parts, the severance being indicated by the double dotted line 57. After severance each part appears as in FIGURE 10. Either before or after severing the two parts, the end faces are machined whereby the exterior surface 42 of the insert extends slightly beyond the adjacent end faces of the portions 41. The carrier ring 22 is now incorporated with the seal member 21 in the manner previously described.

In some instances, the seal member 21 may be incorporated in a valve construction without the other parts comprising the assembly 14. Thus in FIGURE 12 I have shown a gate valve of the wedge type, utilizing some of the features of my invention. The valve gate 61 in this instance is wedge shaped to provide the side valve working surfaces 62. The valve body is recessed to accommodate the seal member 63, which is similar in its construction to the seal member 21 and may be made of nylon. Each of the two seal members 63 can be retained within the body by the threaded connection 64, and it may be sealed with respect to the body by means 65 of the resilient O-ring type. Each annular seal member 63 is provided with a recess, as previously described, which accommodates the insert 66 of a soft resilient material, like Viton. When the valve gate is moved to final closed position, the last part of the closing movement causes the valve working surfaces to be pressed against the lip portions of the seal member 63, thus causing these portions to squeeze the resilient insert and thereby cause the insert to press into tight sealing contact with the gate.

FIGURE 13 shows an embodiment for valves of the ball type. As is well known, such valves comprise a body provided with aligned flow passages and containing a ported valve ball which is rotatable about an axis at right angles to the axis of the flow passages. Turning of the ball through 90° serves to open and close the valve.

In FIGURE 13, a portion of the valve ball is indicated at 71 and is provided with the valve working surface 72 which can be conical or substantially spherical. A portion 73 of the valve body which surrounds the body port 74 is provided with the sealing assembly. The assembly consists of annular seal member 76 which is slidably fitted within the machined bore 77 of the body and made of material like nylon. It is attached to the carrier ring 78 and is urged by compression springs 79 toward the valve working surface 72. The member 76 is sealed with respect to the body by suitable means such as the seal 81 of the resilient O-ring type. The portion 82 of the seal member which is adjacent the valve working surface 72 is provided with the softer resilient insert 83, this insert being formed and bonded within its accommodating recess in substantially the same way as previously described.

In general the arrangement of FIGURE 13 operates in substantially the same manner as the first described embodiment. The insert 83 functions to maintain a fluid-tight seal with respect to the valve working surface 72 under all operating conditions. The effective diameter of this seal is substantially equal to the effective diameter of the seal between the O-ring 81 and the bore 77 and, therefore, this type of assembly is substantially balanced with respect to fluid pressure differentials applied to the same. In other words, an assembly of this type relies upon the thrust of compression springs 79 to provide sufficient force to urge the seal member against the valve working surface for maintaining a seal under all operating conditions.

FIGURE 14 illustrates another embodiment which is adapted particularly for use with the higher operating pressures. The assembly in this instance is constructed for use with a valve of the gate type. The portion 91 represents an annular portion of the body or a mounting ring corresponding to the ring 17 of FIGURE 2. It is provided with a bore 92 for slidably accommodating the annular seal member 93. This seal member is likewise made of two different materials in the same manner as the embodiment of FIGURES 1–12. In other words, the member 93 is made of relatively hard non-metallic resilient material like nylon, together with an insert 94 of softer non-metallic resilient material such as a suitable synthetic rubber or a resilient elastomer of the polyurethane type. The recess is which the insert 94 is disposed is shown somewhat shallower than the recess shown in FIGURE 2 and consists of the side defining surfaces 96 and the bottom defining surface 97. The material of the insert is substantially bonded to these surfaces during manufacture and the insert completely fills the recess without voids.

The seal member 93 of FIGURE 14 likewise seals with respect to the body by suitable means such as the seal ring 98 of the resilient O-ring type. Also it is mounted upon the relatively rigid metal carrier ring 99. Compression springs 101 seat upon the end surfaces 102 of member 93 and the shoulder surfaces 103 of the carrier ring to urge both the seal member and the carrier ring against the cooperating gate. The carrier ring in this instance has a portion 99a which loosely extends within an annular recess 104 in the body portion 91.

The arrangement shown in FIGURE 14 likewise makes sealing contact with the gate on an effective diameter corresponding generally to the diameter of the ball 92, whereby the sealing member is substantially balanced with respect to fluid pressure differential applied to the same.

The embodiment of FIGURE 15 is somewhat similar to that of FIGURE 14 but in this instance two relatively soft resilient inserts 106 and 107 are provided. These inserts are on two diameters whereby they establish seals on two concentric annular areas of the gate. It will be noted that insert 106 has a diameter somewhat greater than the diameter of the bore 92 and insert 107 has a diameter less than that of the bore 92. Thus assuming that sealing contact is established by both inserts, the seal ring 93 presents a fluid pressure area to body pressure and also line pressure in the associated flow passage. In each instance the fluid pressure area is such that the seal member 93 is urged against the valve gate.

I claim:

1. In a valve construction, a body part having flow passages therethrough, a valve part disposed within the body part and movable between open and closed positions, the valve part having a valve working surface, and annular sealing means surrounding one of the body passages and carried by the body part, said sealing means including an annular seal member of relatively hard resilient nylon carried by the body, one end portion of said seal member normally contacting said valve working surface, a recess formed in said one end of the seal member, said recess being defined by outer and inner sides and a bottom surface, said seal member having concentric annular portions formed integral therewith and located at the inner and outer sides of said recess and forming said end portion of the annular seal member, and an insert of softer resilient non-metallic material of durometer hardness of from 60–80 contained within the space of the recess, said insert being bonded to said outer and inner sides and bottom surface that define the recess, said insert presenting an annular area disposed between the free edges of said integral annular portions and which serves to form contact with the valve working surface.

2. In a valve construction, a body part having flow passages therethrough, a valve part disposed within the body part and movable between open and closed positions, the valve part having a valve working surface, and annular sealing means surrounding one of the flow passages and carried by the body part, said sealing means including an annular seal member of relatively hard resilient nylon carried by the body and movable in the direction of the axis of the flow passages, one end portion of said seal member normally contacting said valve working surface, a recess formed in said one end of the seal member, said recess being defined by outer and inner sides and a bottom surface, said seal member having concentric annular portions formed integral therewith and located at the inner and outer sides of said recess and forming said end portion of the annular seal member, an insert of softer resilient non-metallic material of durometer hardness of from 60–80 contained within the space of the recess, said insert being bonded to said outer and inner sides and bottom surface that define the recess, said insert presenting an annular area disposed between the free edges of said integral annular portions and which serves to form sealing contact with the valve working surface, spring means for urging said annular seal member against the adajcent valve working surface thereby urging said portions against the valve working surface together with said annular area of the insert, and means forming a fluid-tight seal between the annular seal member and the body while permitting movements of said annular seal member under the urge of said spring means.

3. A valve as in claim 2 in which the portion of the insert adjacent the bottom surface is of greater radial width than the portion thereof adjacent the end face of the seal member.

4. A valve construction as in claim 2 in which said annular seal member is provided with two of the aforesaid recesses located concentrically within the end face of the seal member and spaced radially, and in which said resilient seal members are disposed in both of said recesses, each insert being formed of softer resilient non-metallic material bonded to the outer and inner sides and bottom defining surface of the corresponding recess.

5. A valve construction as in claim 4 in which the effective diameter of the fluid-tight seal between the annular seal member and the body is intermediate the effective diameters of the said resilient seal members.

6. In a valve construction, a body part having flow passages therethrough, a valve part disposed within the body and movable between open and closed positions, the valve part having a valve working surface, an annular sealing assembly surrounding one of the flow passages and carried by the body part, said sealing assembly including an annular seal member of relatively hard resilient nylon carried by the body and movable in the direction of the axis of the flow passages, the face of one end portion of said seal member normally contacting said valve working surface, a recess formed in said one end portion of the seal member, the recess being defined by outer and inner sides and a bottom surface, the radial width of said recess adjacent said bottom surface being substantially greater than the radial width of the recess at said end face of the annular seal member, said seal member having resiliently bendable annular portions formed integral therewith and located at the inner and outer sides of said recess and forming said end portion of the annular seal member, an insert formed of softer resilient non-metallic material of a durometer hardness of from 60–80 completely filling said recess, said insert being bonded to said outer and inner sides and bottom surface of the recess, said insert presenting an annular exposed area for sealing contact with the valve working surface and which is disposed between the free edges of the annular bendable portions, spring means for urging said annular seal member against the adjacent valve working surface thereby urging said bendable portions against said valve working surface together with said exposed area of the insert, and means forming a fluid-tight seal between the annular member and the body while permitting movements of said annular seal member under the urge of said spring means.

References Cited by the Examiner

UNITED STATES PATENTS

| | | | |
|---|---|---|---|
| 2,815,187 | 12/1957 | Hamer | 251—327 X |
| 2,873,086 | 2/1959 | Bryant | 251—326 X |
| 2,905,197 | 9/1959 | Jones | 251—174 X |
| 2,985,422 | 5/1961 | Anderson | 251—172 |
| 3,033,517 | 5/1962 | Rovang | 251—328 |
| 3,065,951 | 11/1962 | Fennema | 251—172 |
| 3,131,906 | 5/1964 | King | 251—360 |
| 3,132,837 | 5/1964 | Britton | 251—172 |

WILLIAM F. O'DEA, *Primary Examiner.*

CLARENCE R. GORDON, ISADOR WEIL, *Examiners.*